(12) United States Patent
Kim et al.

(10) Patent No.: US 9,142,331 B2
(45) Date of Patent: Sep. 22, 2015

(54) ELASTOMER COMPOSITE WITH IMPROVED DIELECTRIC PROPERTIES AND PRODUCTION METHOD THEREOF

(71) Applicant: KOREA INSTITUTE OF SCIENCE AND TECHNOLOGY, Seoul (KR)

(72) Inventors: Heesuk Kim, Seoul (KR); Kiwon Oh, Seoul (KR); Soon Ho Lim, Seoul (KR); Sang-Soo Lee, Seoul (KR); Tae Ann Kim, Seoul (KR); Min Park, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 25 days.

(21) Appl. No.: 13/693,149

(22) Filed: Dec. 4, 2012

(65) Prior Publication Data

US 2013/0310495 A1 Nov. 21, 2013

(30) Foreign Application Priority Data

May 21, 2012 (KR) .......................... 10-2012-0053749

(51) Int. Cl.
| | |
|---|---|
| C08K 5/34 | (2006.01) |
| B32B 5/16 | (2006.01) |
| B32B 17/10 | (2006.01) |
| B05D 3/10 | (2006.01) |
| H01B 3/02 | (2006.01) |
| B82Y 30/00 | (2011.01) |

(52) U.S. Cl.
CPC ........ *H01B 3/025* (2013.01); *B82Y 30/00* (2013.01)

(58) Field of Classification Search
CPC ........ C08K 5/3445; C08K 5/3472; C08K 5/42
USPC ................... 524/106; 977/750; 428/323, 339; 427/333
See application file for complete search history.

(56) References Cited

U.S. PATENT DOCUMENTS

2010/0009165 A1* 1/2010 Patel et al. .................. 428/323

FOREIGN PATENT DOCUMENTS

| | | | |
|---|---|---|---|
| JP | 2006-351392 A | 12/2006 | |
| JP | 2008-239929 A | 10/2008 | |

* cited by examiner

*Primary Examiner* — Susannah Chung
*Assistant Examiner* — Atnaf Admasu
(74) *Attorney, Agent, or Firm* — Ladas & Parry LLP (57) ABSTRACT

Disclosed is an elastomer-conductive filler composite with improved dielectric properties. The composite includes conductive fillers and an ionic liquid dispersing the conductive fillers. The ionic liquid is used as a dispersant to effectively enhance the dispersion of the conductive fillers, achieving a high dielectric constant and a low dielectric loss of the composite without deteriorating the physical properties of the conductive fillers. The use of the ionic liquid can reduce the number of processing steps and the presence of the conductive fillers at a low concentration in the composite can minimize deterioration of the physical properties of the elastomer. Further disclosed is a method for producing the composite.

16 Claims, 7 Drawing Sheets

ELASTOMER COMPOSITE WITH IMPROVED DIELECTRIC PROPERTIES AND PRODUCTION METHOD THEREOF

CROSS-REFERENCE TO RELATED APPLICATIONS

This application claims priority under 35 U.S.C. §119 to Korean Patent Application No. 10-2012-0053749 filed on May 21, 2012, in the Korean Intellectual Property Office, the disclosure of which is incorporated herein by reference in its entirety.

BACKGROUND OF THE INVENTION

1. Field of the Invention

The present invention relates to an elastomer composite in which the dispersion of conductive fillers is improved by an ionic liquid, achieving improved dielectric properties, and a method for producing the elastomer composite.

2. Description of the Related Art

Polymers have excellent characteristics in terms of processability, mechanical strength, electrical insulation, optical transparency, mass productivity, etc. compared to other materials. Due to these advantages, polymers are used as important new materials in high-technology industrial applications, including semiconductors, electrical/electronic industry, aerospace, defense industry, displays and alternative energy. The advantages of polymeric materials as dielectric materials are various physical properties obtainable by molecular design and excellent moldability. However, polymeric materials have the disadvantages of poor thermal and mechanical properties over inorganic materials as well as poor dielectric properties. These disadvantages greatly limit the application of polymeric materials to new materials.

Polymers are currently being investigated to utilize their dielectric properties in high-κ gate dielectrics for flexible electronic materials, capacitors for energy storage, and dielectric elastomer actuators (DEAs).

High dielectric constant polymeric materials in single phases are free from problems associated with the dispersion of multi-phase materials, thus being ideal for use in embedded capacitors. In recent years, a research team from the University of Pennsylvania has reported a method for preparing an electroactive PVDF polymer having a dielectric constant of 100 by exposing a PVDF copolymer film to radiation, followed by electric field poling. Shizuoka University, Japan, has achieved a dielectric constant of 20 or above using a polymer having polar cyano groups. Further, the German Plastic Institute and the University of Wales, UK, have prepared polymer dielectrics with a dielectric constant of 8 or above using PVDF and relevant copolymers. However, they suffer from problems of high cost, low yield and suitability for subsequent processing, limiting their application to the manufacture of large-area embedded capacitors.

Dielectric elastomer actuators based on electroactive polymers (EAPs) feature the ability to mimic the movement of human muscles. This feature has motivated research aimed at applying dielectric elastomer actuators to the development of artificial muscles.

Electroactive polymers, i.e. elastomers, refer to materials that undergo deformation in response to a voltage or force applied thereto. Electroactive polymers have the ability to convert such an electrical force to a mechanical strain and can be applied to dielectric elastomer actuators. However, since elastomers have relatively low dielectric constants, the application of high operating voltages is inevitable for actuation behavior. Thus, attempts to increase the dielectric constant of elastomers for the purpose of lowering high operating voltages applied to the elastomers are needed to increase the commercial viability of dielectric elastomer actuators using the elastomers and to reduce risks accompanied by the application of the high voltages.

To solve such problems, research has been conducted recently to increase the dielectric constant of elastomers by compounding high-κ fillers with the elastomers. For example, Japanese Unexamined Patent Publication Nos. 2008-239929 and 2005-177003 disclose that the addition of lithium-containing ceramic fillers to thermoplastic elastomers increases the dielectric constants of the elastomers at low cost to achieve improved electrodynamic conversion efficiency. PCT International Publication No. WO 98/04045 discloses an actuator using a composite produced by adding conductive fillers, such as carbon black, graphite or metal particles, to an elastomer. Investigations into the dispersion of one-dimensional, high aspect ratio conductive fillers, such as carbon nanotubes, in elastomers to ensure high dielectric constants of the elastomers are being conducted by some groups. However, the dielectric constant and dielectric loss of such an insulator/conductor composite increase simultaneously with increasing amount of the conductors filled. The increased dielectric loss of the composite leads to a drop in the dielectric strength of the elastomer. This phenomenon causes a dielectric breakdown in the elastomer even at a low voltage to substantially limit the application of the elastomer. In attempts to solve such problems, studies are currently underway to lower the dielectric loss of elastomer composites by using chemically or physically surface-modified carbon nanotubes.

SUMMARY OF THE INVENTION

The present invention has been made in an effort to solve the above problems, and it is a first object of the present invention to provide an elastomer-conductive filler composite in which an ionic liquid is used as a dispersant to effectively enhance the dispersion of conductive fillers, achieving high dielectric constant and relatively low dielectric loss.

It is a second object of the present invention to provide a method for producing the elastomer-conductive filler composite.

In order to accomplish the first object of the present invention, there is provided an elastomer-conductive filler composite including an elastomer matrix, conductive fillers dispersed in the elastomer matrix, and an ionic liquid dispersing the conductive fillers.

In an embodiment of the present invention, the elastomer matrix may be selected from the group consisting of silicone, fluorosilicone, urethane, isoprene, chloroprene, neoprene, butadiene, styrene-butadiene, acrylonitrile, acrylic elastomer, fluoroelastomers, perfluoroelastomers, polyether block amides.

In a further embodiment of the present invention, the conductive fillers may be selected from the group consisting of single-walled carbon nanotubes, double-walled carbon nanotubes, multi-walled carbon nanotubes, graphene, graphene nanoribbons, reduced graphene oxides, graphite, carbon black, carbon fibers, and fullerene.

In another embodiment of the present invention, the ionic liquid may include an Di, tri and tetraalkylimidazolium cation and at least one anion selected from the group consisting of $BF_4$, $B(CN)_4$, $CH_2CHBF_3$, $CF_3BF_3$, $C_2F_5BF_3$, $nC_3H_7BF_3$, $nC_4H_9BF_3$, $PF_6$, $CF_3CO_2$, $CF_3SO_3$, $N(SO_2CF_3)_2$, $N(COCF_3)$ $(SO_2CF_3)$, $N(SO_2F)_2$, $N(CN)_2$, $C(CN)_3$, SCN, SeCN, $CuCl_2$, $AlCl_4$, $Al_2Cl_7$, OH.

In another embodiment of the present invention, the conductive fillers may be present in an amount of 0.00001 to 5 parts by weight, based on 100 parts by weight of the elastomer matrix.

In another embodiment of the present invention, the conductive fillers may be present in such an amount that the elastomer-conductive filler composite has a resistivity of $1.0 \times 10^3$ Ω·cm or more.

In another embodiment of the present invention, the ionic liquid may be present in an amount of 0.00001 to 30 parts by weight, based on 1 part by weight of the conductive fillers.

In order to accomplish the second object of the present invention, there is provided a method for producing an elastomer-conductive filler composite, including (a) mixing conductive fillers made of carbon with an ionic liquid, (b) dispersing the mixture in a solvent to obtain a filler dispersion, (c) mixing the filler dispersion with an elastomer matrix, and (d) removing the solvent from the mixture of step (c).

In an embodiment of the present invention, the solvent used in step (b) may be selected from the group consisting of N,N-dimethylformamide (DMF), N-methylpyrrolidone (NMP), dimethylacetamide (DMAc), toluene, tetrahydrofuran (THF), ethanol, methanol, chloroform, dichloromethane, and mixtures thereof.

In a further embodiment of the present invention, step (d) may further include adding a curing agent to the mixture from which the solvent has been removed.

According to the present invention, the conductive fillers are dispersed in the ionic liquid and mixed with the elastomer matrix to achieve a high dielectric constant and a low dielectric loss of the elastomer-conductive filler composite without deteriorating the physical properties of the conductive fillers. In addition, the presence of the conductive fillers at a low concentration in the composite can minimize deterioration of the physical properties of the elastomer.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention will now be described in more detail.

The present invention provides an elastomer-conductive filler composite in which conductive fillers are dispersed using an ionic liquid. The conductive fillers are made of carbon and are used at a low concentration. The conductive fillers mixed with the ionic liquid ensure a high dielectric constant and a low dielectric loss of the elastomer-conductive filler composite without losing their physical properties. The use of the ionic liquid reduces the number of processing steps and can minimize deterioration of the physical properties of the elastomer.

In the conventional insulator-conductor composite described above, one-dimensional, high aspect ratio conductive fillers are dispersed in an elastomer. The fillers have a dispersion phase size at a micrometer level and aggregate to form conducting paths. The conducting paths cause dielectric loss, thus limiting an improvement in electrodynamic conversion efficiency. This limitation leads to increases in dielectric loss and leakage current and worsens the dielectric breakdown of the elastomer despite an increase in dielectric constant by the addition of the conductive fillers. Thus, the present inventors have found that chemical or physical surface modification of the conductive fillers made of carbon with the ionic liquid and dispersion of the surface-modified conductive fillers in the ionic liquid contribute to a reduction in dielectric loss. The present invention has been accomplished based on this finding.

The present invention can be understood by space charge polarization in a dielectric. Space charge polarization occurs at a frequency of $10^4$ Hz or below and its increase induces a higher dielectric constant of the dielectric.

Figure 1:
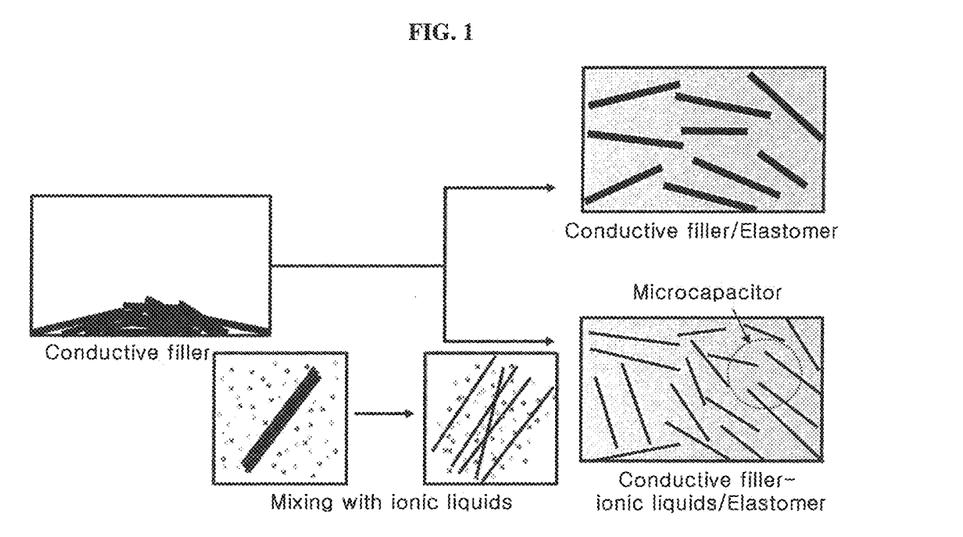
FIG. 1 is a schematic diagram showing the dispersion of conductive fillers in an ionic liquid in accordance with an embodiment of the present invention.

That is, space charge polarization is considered the most important factor in improving the dielectric properties of a dielectric in a low-frequency region. In the present invention, the increased dielectric constant of the elastomer composite can be understood as a rise of space charge polarization by the presence of the conductive filler in the elastomer composite. An important cause for the increased dielectric constant of the elastomer composite can be explained by an increase in the dielectric constant of individual microcapacitors formed by the conductive fillers and the resulting increased space charge polarization leads to an increase in the dielectric constant of the elastomer composite. In the present invention, an increase in space charge polarization induced by the conductive fillers brings about an improvement in dielectric constant, and at the same time, the dispersion of the conductive fillers is maximized to lower the dielectric loss of the elastomer composite. FIG. 1 shows an increase in the number of individual microcapacitors of the conductive fillers thinly exfoliated by the ionic liquid. The thinly formed conductive fillers function to inhibit leakage current.

As can be seen from results obtained in Examples Section that follows, the elastomer-conductive filler composite of the present invention exhibits a high dielectric constant and a low dielectric loss without deteriorating the physical properties of the conductive fillers.

Specifically, the present invention provides an elastomer-conductive filler composite including an elastomer matrix, conductive fillers dispersed in the elastomer matrix, and ionic liquids dispersing the conductive fillers.

The elastomer matrix may be selected from the group consisting of silicone, fluorosilicone, urethane, isoprene, chloroprene, neoprene, butadiene, styrene-butadiene, acrylonitrile, acrylic elastomer, fluoroelastomers, perfluoroelastomers, polyether block amides. The use of silicone is particularly advantageous over the other elastomers in that the elastomer-conductive filler composite of the present invention has a low viscoelasticity and an appropriate actuation strain and can be operated in a broad temperature range.

The conductive fillers may be selected from the group consisting of single-walled carbon nanotubes, double-walled carbon nanotubes, multi-walled carbon nanotubes, graphene, graphene nanoribbons, reduced graphene oxides, graphite, carbon black, carbon fibers, and fullerene. Particularly, the use of single-walled carbon nanotubes brings about a high dielectric constant in a low-frequency region, which is necessary for actuation behavior.

The ionic liquid refers to a salt including a cation and an anion or its hydrate or solvate that has a liquid phase at or around room temperature. For example, the ionic liquid may have a melting point of about 100° C. or below. Examples of ionic liquids suitable for use in the present invention include those disclosed in Tunckol et al., CARBON 50 (4) 4303-4334, etc.

Particularly, the ionic liquid may include an Di, tri and tetraalkylimidazolium cation and at least one anion selected from the group consisting of $BF_4$, $B(CN)_4$, $CH_2CHBF_3$, $CF_3BF_3$, $C_2F_5BF_3$, $nC_3H_7BF_3$, $nC_4H_9BF_3$, $PF_6$, $CF_3CO_2$, $CF_3SO_3$, $N(SO_2CF_3)_2$, $N(COCF_3)(SO_2CF_3)$, $N(SO_2F)_2$, $N(CN)_2$, $C(CN)_3$, SCN, SeCN, $CuCl_2$, $AlCl_4$, $Al_2Cl_7$, OH. The use of $BF_4^-$ or $PF_6^-$ as the anion is preferred.

Particularly, the elastomer-conductive filler composite of the present invention can be produced by adding the ionic liquid including an imidazolium cation to carbon nanotubes as the conductive fillers, dispersing the carbon nanotubes in the ionic liquid, and adding silicone as the elastomer to the dispersion (that is, by sequentially adding the constituent materials rather than by adding the materials together all at once). In this case, it is confirmed that a maximized dielectric constant and a minimized dielectric loss of the elastomer-conductive filler composite are obtained without deteriorating the mechanical properties of the elastomer.

The content of the conductive fillers is from 0.00001 to 5 parts by weight, based on 100 parts by weight of the elastomer matrix. The conductive fillers are more preferably present in an amount ranging 1 to 2 parts by weight, based on 100 parts by weight of the elastomer matrix. Within this range, the lowest dielectric loss relative to dielectric constant can be obtained. If the content of the conductive fillers is lower than 0.00001 parts by weight, there is no substantial increase in dielectric constant. Meanwhile, if the content of the conductive fillers exceeds 5 parts by weight, a steep increase in dielectric loss may be caused and conducting paths may be formed in the composite.

The content of the conductive fillers in the elastomer-conductive filler composite may be greater than or equal to the dielectric constant percolation threshold but lower than the conductivity percolation threshold.

The expression "the content of the conductive fillers is greater than or equal to the dielectric constant percolation threshold" means that "the elastomer-conductive filler composite includes the conductive fillers in an amount sufficient to substantially significantly increase the dielectric constant of the composite". The "amount sufficient to substantially significantly increase the dielectric constant of the composite" should be determined by comparison with the intrinsic dielectric constant of the elastomer in view of the characteristics of the material. For example, when silicone having an intrinsic dielectric constant of 2.65 at 100 Hz is used as the elastomer and the content of the conductive fillers in the elastomer-conductive filler composite is from 1.6 to 1.8 parts by weight, the dielectric constant of the composite is increased to 3,500 at 10 Hz. However, the dielectric constants of conductive filler-polymer composite systems may be varied depending on the performance (e.g., electrical conductivity or dispersion state) of fillers, making it difficult to express the dielectric constants as absolute values. Therefore, the content of the conductive fillers in each system is defined as an amount where a maximum dielectric constant of the system is exhibited. In the present invention, the content of the fillers where the dielectric constant of the composite is significantly increased compared to the intrinsic dielectric constant of the elastomer can be defined as the "amount sufficient to substantially significantly increase the dielectric constant of the composite".

The expression "the content of the conductive fillers is lower than the conductivity percolation threshold" means that "the elastomer-conductive filler composite includes the conductive fillers in such an amount that no substantial conductivity of the composite is exhibited" or "the elastomer-conductive filler composite includes the conductive fillers in such an amount that the composite has a substantially non-conductive resistance value". The "no substantial conductivity" or the "the substantially non-conductive resistance value" means that the composite has a resistivity of $1.0 \times 10^3$ Ω·cm or more, preferably $1.0 \times 10^5$ Ω·cm or more.

The content of the ionic liquid in the elastomer-conductive filler composite of the present invention may be from 0.00001 to 30 parts by weight, based on 1 part by weight of the conductive fillers. The use of the ionic liquid in an amount of 5 parts by weight is preferred because the highest dielectric constant and the lowest dielectric loss of the composite are obtained. If the ionic liquid is used in an amount of less than 0.00001 parts by weight, it may be insufficient to improve the dispersion of the conductive fillers. Meanwhile, the use of the ionic liquid in an amount of exceeding 30 parts by weight ensures a dielectric constant higher than the intrinsic value of the conductive fillers but results in a lower dielectric constant and a higher dielectric loss than those obtained by the use of the ionic liquid in an amount exceeding 5 parts by weight.

The elastomer-conductive filler composite of the present invention exhibits maximum dielectric properties at a low frequency of 100 Hz while inhibiting an increase in dielectric loss at the dielectric constant percolation threshold.

The present invention also provides a method for producing an elastomer-conductive filler composite, including (a) mixing conductive fillers made of carbon with an ionic liquid, (b) dispersing the mixture in a solvent to obtain a filler dispersion, (c) mixing the filler dispersion with an elastomer matrix, and (d) removing the solvent from the mixture of step (c).

The conductive fillers, the ionic liquids and the elastomer matrix are the same as those described above. The solvent used in step (b) may be selected from the group consisting of N,N-dimethylformamide (DMF), N-methylpyrrolidone (NMP), dimethylacetamide (DMAc), toluene, tetrahydrofuran (THF), ethanol, methanol, chloroform, dichloromethane, and mixtures thereof. Step (d) may further include adding a curing agent to the mixture from which the solvent has been removed.

The following examples are provided to assist in further understanding of the invention. However, these examples are intended for illustrative purposes only and the invention is not limited thereto. Therefore, it will be evident to those skilled in the art that various modifications and variations can be made without departing from the scope and spirit of the invention.

EXAMPLES

Example 1

First, single-walled carbon nanotubes (SWNTs) with high conductivity as conductive fillers were mixed with 1-butyl-3-methylimidazolium bis(trifluoromethanesulfonyl)imide (BMIMTFSI) as an ionic liquid to prepare a mixture in the form of a gel. As a result of mixing, the conductive fillers were thinly exfoliated. Subsequently, the mixture was dispersed in toluene by sonication for 1 hr. Silicone as an elastomer was added to the dispersion and stirred at room temperature for 6 hr. The single-walled carbon nanotubes were used in an amount of 1-2.5 parts by weight with respect to 100 parts by weight of the silicone and the ionic liquid was used in an amount of 5 parts by weight with respect to 1 part of the single-walled carbon nanotubes. The resulting mixture was evaporated to dryness under vacuum for 48 hr to remove the solvent. Subsequently, a curing agent was added in an amount of 10 parts by weight with respect to 100 parts by weight of the silicone, followed by mixing using a paste mixer to produce a composite composed of the silicone, the single-walled carbon nanotubes and the ionic liquid. The composite was coated by a doctor blade technique to form an about 100 μm thick film. The film was cured at 125° C. for 20 min. For measurement of dielectric properties, gold (Au) was coated to a thickness of about 10 nm on the film to form an upper electrode.

Comparative Example 1

The procedure of Example 1 was repeated except that the single-walled carbon nanotubes only were used instead of preparing the mixture of the single-walled carbon nanotubes and the ionic liquid.

Comparative Example 2

The procedure of Example 1 was repeated except that the ionic liquid was used in amounts of 1 and 10 parts by weight, based on 1 part of the single-walled carbon nanotubes.

Test Example 1

Observation of Dispersion States

The microstructures of the conductive fillers in the composites of Example 1 and Comparative Example 1 were confirmed by transmission electron microscopy (TEM) and scanning electron microscopy (SEM).

Figure 2:
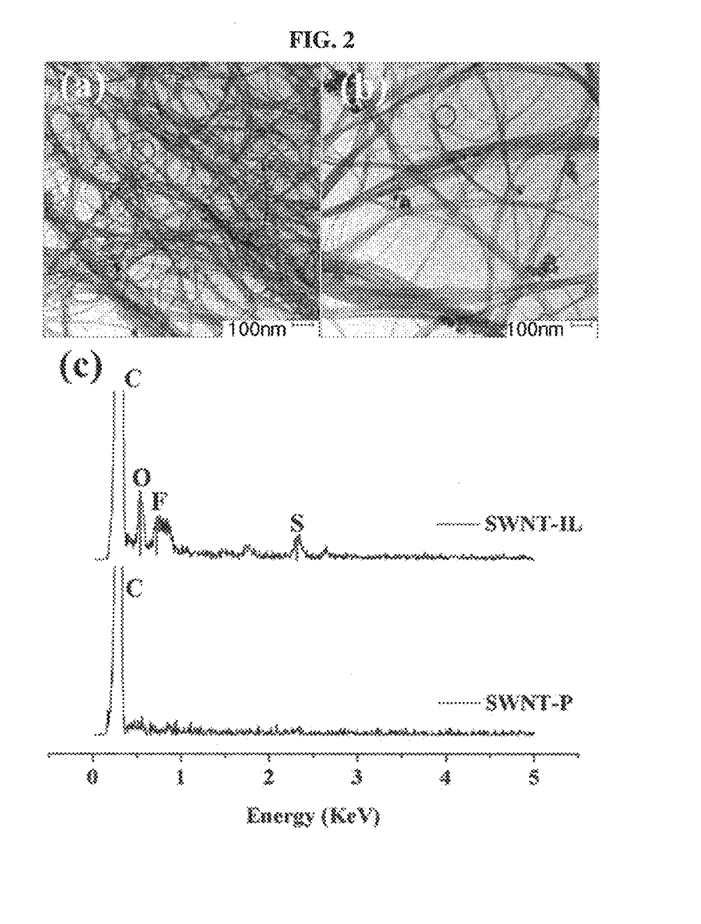
FIG. 2a is a TEM image of single-walled carbon nanotubes as conductive fillers that were not mixed with an ionic liquid in Comparative Example 1.
FIG. 2b is a TEM image of dispersed single-walled carbon nanotubes as conductive fillers dispersed by mixing with an ionic liquid and ultrasonicating the mixture for 1 hour in Example 1.
FIG. 2c shows the results of EDS elemental analysis for single-walled carbon nanotubes as conductive fillers dispersed by mixing with an ionic liquid and ultrasonicating the mixture for 1 hour in Example 1 (top) and the results of EDS elemental analysis for single-walled carbon nanotubes that were not mixed with an ionic liquid in Comparative Example 1 (bottom)

FIG. 2 shows TEM images of the microstructures of the conductive fillers in the composites of Example 1 and Comparative Example 1. Specifically, FIG. 2a is a TEM image of the single-walled carbon nanotubes that were not mixed with the ionic liquid in Comparative Example 1, and FIG. 2b is a TEM image of the single-walled carbon nanotubes dispersed by mixing with the ionic liquid and ultrasonicating the mixture for 1 hour in Example 1. As can be seen from FIG. 2a, many portions of the single-walled carbon nanotubes aggregated. In contrast, the TEM image of FIG. 2b shows that the conductive fillers dispersed in the ionic liquid were relatively reduced in thickness. FIG. 2c shows the results of EDS elemental analysis for the single-walled carbon nanotubes dispersed by mixing with the ionic liquid and ultrasonicating the mixture for 1 hour in Example 1 (top) and the results of EDS elemental analysis for the single-walled carbon nanotubes that were not mixed with the ionic liquid in Comparative Example 1 (bottom). FIG. 2c demonstrates the presence of the ionic liquid in the SWNT-IL.

Figure 3:
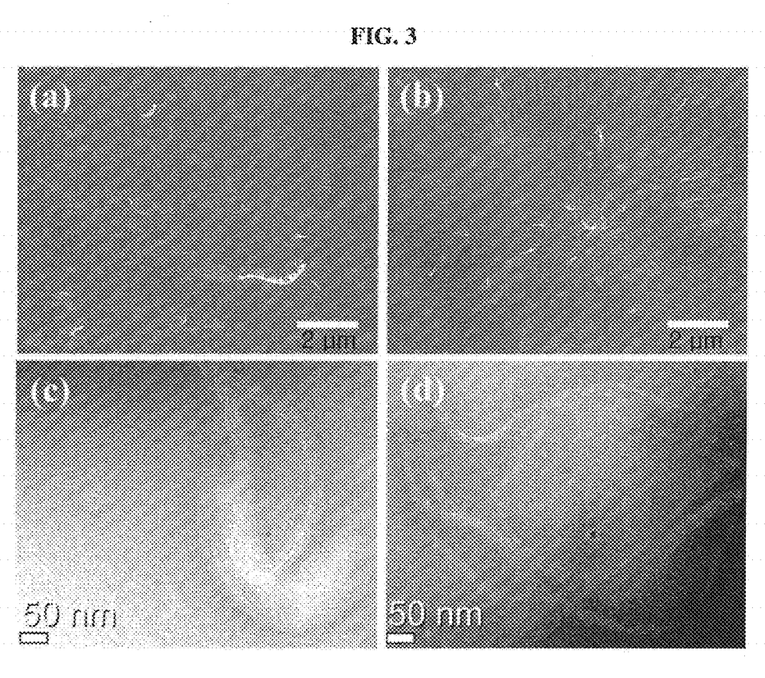
FIGS. 3a and 3c are SEM and TEM images showing the cross-section of an elastomer-conductive filler composite film produced in Comparative Example 1 in which conductive fillers were not dispersed in an ionic liquid, respectively.
FIGS. 3b and 3d are SEM and TEM images showing the cross-section of an elastomer-conductive filler composite film produced in Example 1 in which conductive fillers were dispersed in an ionic liquid, respectively.

FIG. 3 shows SEM and TEM images taken to confirm the dispersion states of the single-walled carbon nanotubes in the silicone/SWNT composite of Comparative Example 1 and the silicone/SWNT-IL composite of Example 1. Specifically, FIGS. 3a and 3c are SEM and TEM images showing the cross-section of the elastomer-conductive filler composite film of Comparative Example 1 in which the conductive fillers were not dispersed in the ionic liquid, respectively, and FIGS. 3b and 3d are SEM and TEM images showing the cross-section of the elastomer-conductive filler composite film of Example 1 in which the conductive fillers were dispersed in the ionic liquid, respectively. Specimens were sampled by cutting the composites. FIG. 3 demonstrates that the composite of Example 1 (FIGS. 3b and 3d) included a larger amount of the conductive fillers having a smaller thickness in the same area than the composite of Comparative Example 1 (FIGS. 3a and 3c).

Test Example 2

Observation of Dielectric Properties

In this example, the dielectric properties of the silicone/SWNT composite of Comparative Example 1 and the silicone/SWNT-IL composites of Comparative Example 2 and Example 1 were confirmed by measuring the capacitances of the composites using an LCR meter and calculating the dielectric constants and dielectric loss values thereof through the corresponding formulae.

Figure 4:
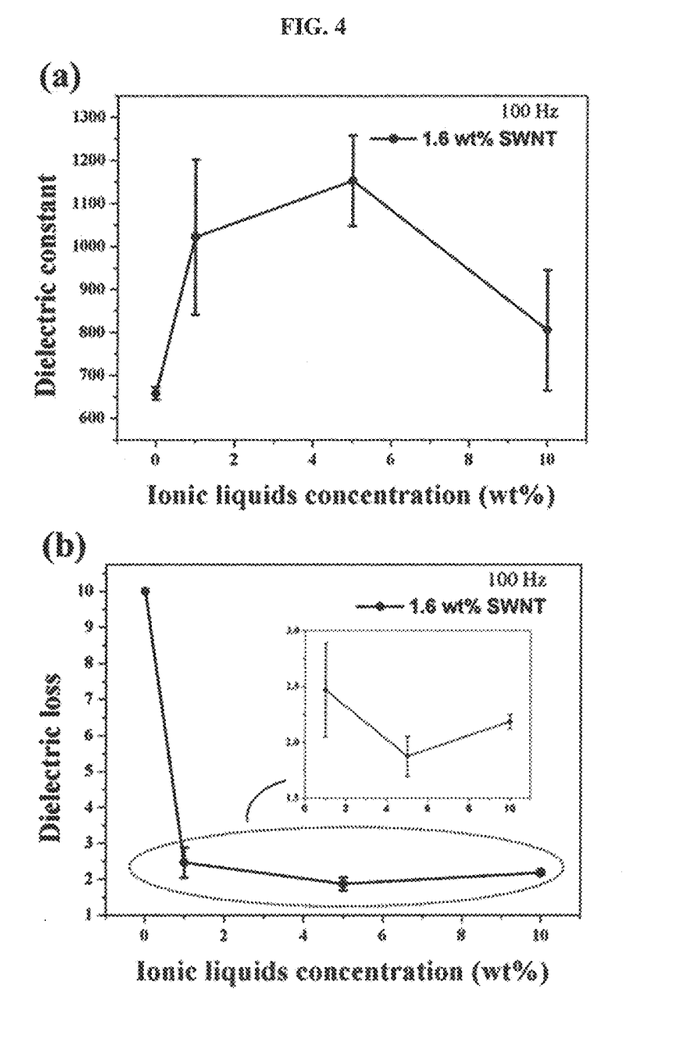
FIGS. 4a and 4b show changes in the dielectric properties (dielectric constant (4a) and dielectric loss (4b)) of elastomer-conductive filler composites produced in Example 1 and Comparative Examples 1 and 2 with varying weights of an ionic liquid in a fixed amount of conductive fillers.

FIGS. 4a and 4b show changes in the dielectric properties (dielectric constant (4a) and dielectric loss (4b)) of the elastomer-conductive filler composites with varying weights of the ionic liquid in a fixed amount of the conductive fillers. As shown in FIGS. 4a and 4b, when the amount of the single-walled carbon nanotubes was 1.6 parts by weight and the frequency was 100 Hz, the composite of Comparative Example 1 showed a dielectric constant of about 657 (FIG. 4a) and a dielectric loss value of 10 (FIG. 4b), which is greater than or equal to the maximum allowable value of the measurement instrument, whereas the composite of Example 1 showed a dielectric constant of about 1153, which is about two times higher than that of the composite of Comparative Example 1 (FIG. 4a), and a lower dielectric loss value of about 1.8 (FIG. 4b). The composite of Comparative Example 2, which was produced using the ionic liquid in an amount of 1 part by weight with respect to 1 part by weight of the single-walled carbon nanotubes, showed a dielectric constant of 1022 and a dielectric loss of about 2.4. The composite of Comparative Example 2, which was produced using the ionic liquid in an amount of 10 parts by weight with respect to 1 part by weight of the single-walled carbon nanotubes, showed a dielectric constant of 805 and a dielectric loss of about 2.2 (FIGS. 4a and 4b). From FIG. 4, it could be confirmed that the addition of the ionic liquid increases the dielectric constants of the composites and particularly greatly decreases the dielectric loss values of the composites. Further, it was confirmed that the highest dielectric constant and the lowest dielectric loss can be obtained when the content of the ionic liquid is 5 parts by weight with respect to 1 part by weight of the single-walled carbon nanotubes.

Figure 5A:
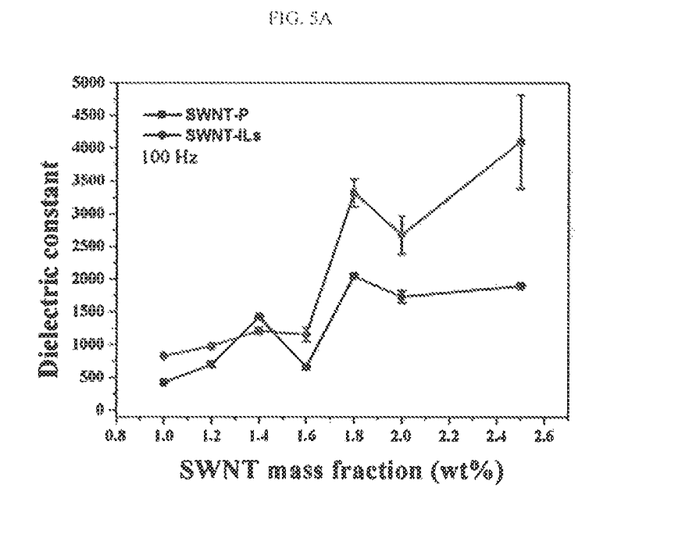
FIGS. 5a to 5d show changes in the dielectric properties (dielectric constant at a frequency of 100 Hz (5a), dielectric constant at a frequency of 1000 Hz (5b), dielectric loss at a frequency of 100 Hz (5c), and dielectric loss at a frequency of 1000 Hz (5d)) of an elastomer-conductive filler composite (SWNT-P) film produced in Comparative Example 1 in which conductive fillers were not dispersed in an ionic liquid, and an elastomer-conductive filler composite (SWNT-IL) film produced in Example 1 in which conductive fillers were dispersed in an ionic liquid, with varying amounts of conductive fillers at particular frequencies.
Figure 5B:
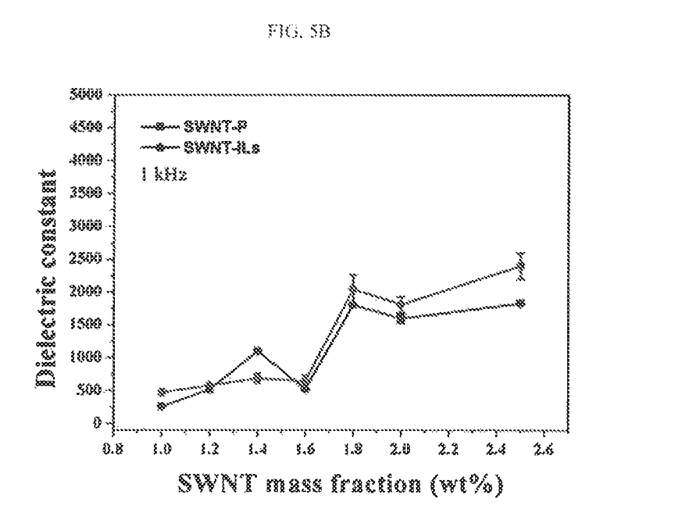
Figure 5C:
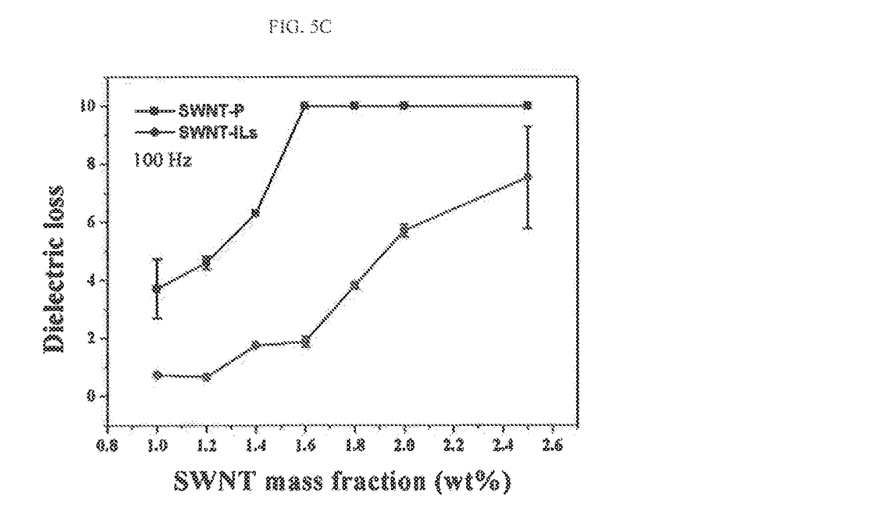
Figure 5D:
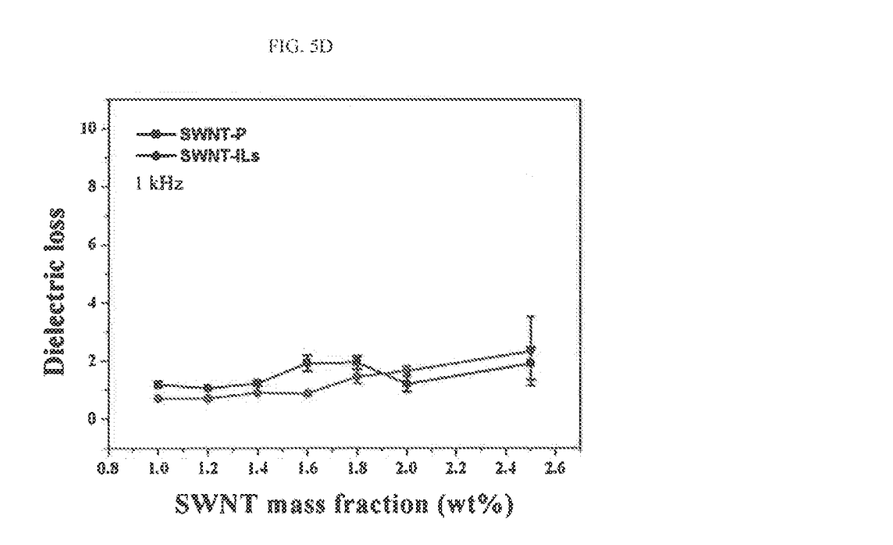

The dielectric properties of the silicone/SWNT composite of Comparative Example 1 and the silicone/SWNT-IL composite of Example 1 were observed in various amounts of the conductive fillers and at frequencies of 100 and 1000 Hz. The results are shown in FIG. 5. Specifically, FIGS. 5a to 5d show changes in the dielectric properties (dielectric constant at a frequency of 100 Hz (5a), dielectric constant at a frequency of 1000 Hz (5b), dielectric loss at a frequency of 100 Hz (5c), and dielectric loss at a frequency of 1000 Hz (5d)) of the elastomer-conductive filler composite (SWNT-P) film produced in Comparative Example 1 and the elastomer-conductive filler composite (SWNT-IL) film produced in Example 1 with varying amounts of the conductive fillers at the particular frequencies. The SWNT-P indicates the elastomer-conductive filler composite of Comparative Example 1 in which the conductive fillers were not dispersed in the ionic liquid, and the SWNT-IL indicates the elastomer-conductive filler composite of Example 1 in which the conductive fillers were dispersed in the ionic liquid. An increase in dielectric constant was observed with increasing amount of the conductive fillers. Particularly, the silicone/SWNT-IL composite had substantially higher dielectric constants (FIG. 5a) and lower dielectric loss values (FIG. 5b) at a frequency of 100 Hz than the silicone/SWNT composite. At a frequency of 100 Hz, the dielectric constants of the silicone/SWNT-IL composite were not significantly higher than those of the silicone/SWNT composite and the dielectric loss values of the silicone/SWNT-IL composite dropped to a level similar to those of the silicone/SWNT composite (FIG. 5d). From these results, it could be confirmed that improvement in the dielectric properties of the composites using the conductive fillers can be maximized in a low frequency region.

Figure 6:
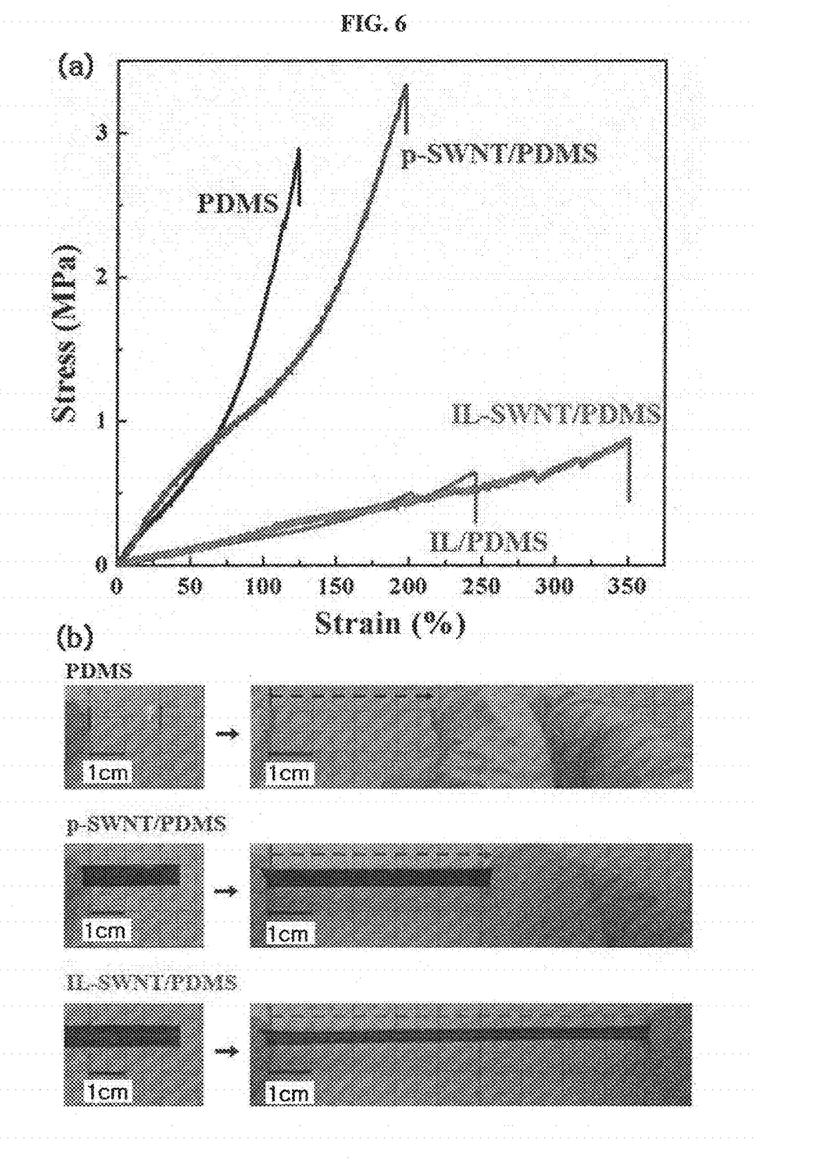
FIGS. 6a and 6b show changes in the mechanical properties of an elastomer (PDMS), an elastomer-conductive filler composite (p-SWNT/PDMS) produced without using an ionic liquid in Comparative Example 1, an elastomer including an ionic liquid (IL/PDMS), and an elastomer-conductive filler composite (IL-SWNT/PDMS) produced in Example 1 in which conductive fillers were dispersed in an ionic liquid (6a: stress-strain curves indicating modulus of elasticity, and 6b: actual images).

The elastomer (PDMS), the elastomer-conductive filler composite (p-SWNT/PDMS) produced without using the ionic liquid in Comparative Example 1, the elastomer including the ionic liquid (IL/PDMS), and the elastomer-conductive filler composite (IL-SWNT/PDMS) produced in Example 1 in which the conductive fillers were dispersed in the ionic liquid were evaluated for mechanical properties. The results are shown in FIG. 6. The stress-strain curves of FIG. 6, which are indicative of the moduli of elasticity of the composites, show that the elastomer (PDMS) had a very low strain despite the consumption of a considerable stress. By the same force as that applied to the elastomer (PDMS), the modulus of elasticity of the elastomer-conductive filler composite (p-SWNT/PDMS) was increased about twice but did not exceed 200%. In contrast, the elastomer including the ionic liquid (IL/PDMS) and the elastomer-conductive filler composite (IL-SWNT/PDMS) of Example 1 showed high strains. Particularly, the IL-SWNT/PDMS of Example 1 showed a modulus of elasticity of a maximum of 350%. FIG. 6b shows actual images showing the elasticity of the composites. The length of PDMS was increased about twice from 2 cm to 3.8 cm and the length of the p-SWNT/PDMS was increased 2.65 times from 2 cm to 5.3 cm. In contrast, the length of the IL-SWNT/PDMS was increased about 4.5 times from 2 cm to 9 cm. From these results, the conclusion can be drawn that the use of the ionic liquid improves the elasticity of the composites.

What is claimed is:

1. An elastomer-conductive filler composite comprising a matrix consisting of an elastomer, conductive fillers dispersed in the elastomer matrix, and an ionic liquid, wherein the conductive fillers are dispersed in the elastomer matrix by a dispersing agent consisting of the ionic liquid, wherein the ionic liquid comprises a di, tri and tetraalkylimidazolium cation and at least one anion selected from the group consisting of $B(CN)_4$, $CH_2CHBF_3$, $CF_3BF_3$, $C_2F_5BF_3$, $nC_3H_7BF_3$, $nC_4H_9BF_3$, $PF_6$, $CF_3CO_2$, $N(SO_2CF_3)_2$, $N(COCF_3)(SO_2CF_3)$, $N(SO_2F)_2$, $N(CN)_2$, $C(CN)_3$, SCN, SeCN, $CuCl_2$, $AlCl_4$, $Al_2Cl_7$, and OH, and wherein the ionic liquid is present in the composite in an amount of more than 1 part by weight and less than 10 parts by weight, based on 1 part by weight of the conductive fillers.

2. The elastomer-conductive filler composite according to claim 1, wherein the elastomer is selected from the group consisting of silicone, fluorosilicone, urethane, isoprene, chloroprene, neoprene, butadiene, styrene-butadiene, acrylonitrile, acrylic elastomer, fluoroelastomers, perfluoroelastomers, and polyether block amides.

3. The elastomer-conductive filler composite according to claim 1, wherein the conductive fillers are selected from the group consisting of single-walled carbon nanotubes, double-walled carbon nanotubes, multi-walled carbon nanotubes, graphene, graphene nanoribbons, reduced graphene oxides, graphite, carbon black, carbon fibers, and fullerene.

4. The elastomer-conductive filler composite according to claim 1, wherein the ionic liquid comprises a di, tri and tetraalkylimidazolium cation and at least one anion selected from the group consisting of $B(CN)_4$, $PF_6$, $CF_3CO_2$, $N(CN)_2$, $C(CN)_3$, SCN, SeCN, $CuCl_2$, $AlCl_4$, $Al_2Cl_7$, and OH.

5. The elastomer-conductive filler composite according to claim 1, wherein the conductive fillers are present in an amount of 0.00001 to 5 parts by weight, based on 100 parts by weight of the elastomer matrix.

6. The elastomer-conductive filler composite according to claim 1, wherein the conductive fillers are present in such an amount that the elastomer-conductive filler composite has a resistivity of $1.0 \times 10^3$ Ω·cm or more.

7. A method for producing the elastomer-conductive filler composite according to claim 1, comprising
    (a) mixing conductive fillers made of carbon with an ionic liquid that comprises a di, tri and tetraalkylimidazolium cation and at least one anion selected from the group consisting of $B(CN)_4$, $CH_2CHBF_3$, $CF_3BF_3$, $C_2F_5BF_3$, $nC_3H_7BF_3$, $nC_4H_9BF_3$, $PF_6$, $CF_3CO_2$, $N(SO_2CF_3)_2$, $N(COCF_3)(SO_2CF_3)$, $N(SO_2F)_2$, $N(CN)_2$, $C(CN)_3$, SCN, SeCN, $CuCl_2$, $AlCl_4$, $Al_2Cl_7$, OH, (b) dispersing the mixture in a solvent to obtain a filler dispersion, (c) mixing the filler dispersion with the matrix consisting of the elastomer, and (d) removing the solvent from the mixture of step (c).

8. The method according to claim 7, wherein the solvent used in step (b) is selected from the group consisting of N,N-dimethylformamide (DMF), N-methylpyrrolidone (NMP), dimethylacetamide (DMAc), toluene, tetrahydrofuran (THF), ethanol, methanol, chloroform, dichloromethane, and mixtures thereof.

9. The method according to claim 7, wherein step (d) further comprises adding a curing agent to the mixture from which the solvent has been removed.

10. The elastomer-conductive filler composite according to claim 1, wherein the ionic liquid comprises at least one anion selected from the group consisting of $CH_2CHBF_3$, $CF_3BF_3$, $C_2F_5BF_3$, $nC_3H_7BF_3$, and $nC_4H_9BF_3$.

11. The elastomer-conductive filler composite according to claim 1, wherein the ionic liquid comprises at least one anion selected from the group consisting of $B(CN)_4$, $N(CN)_2$, $C(CN)_3$, SCN, and SeCN.

12. The elastomer-conductive filler composite according to claim 1, wherein the ionic liquid comprises at least one anion selected from the group consisting of $N(SO_2CF_3)_2$, $N(COCF_3)(SO_2CF_3)$, and $N(SO_2F)_2$.

13. The method according to claim 7, wherein the ionic liquid comprises at least one anion selected from the group consisting of $CH_2CHBF_3$, $CF_3BF_3$, $C_2F_5BF_3$, $nC_3H_7BF_3$, and $nC_4H_9BF_3$.

14. The method according to claim 7, wherein the ionic liquid comprises at least one anion selected from the group consisting of $CuCl_2$, $AlCl_4$, $Al_2Cl_7$.

15. The method according to claim 7, wherein the ionic liquid comprises at least one anion selected from the group consisting of $B(CN)_4$, $N(CN)_2$, $C(CN)_3$, SCN, and SeCN.

16. The method according to claim 7, wherein the ionic liquid comprises at least one anion selected from the group consisting of $N(SO_2CF_3)_2$, $N(COCF_3)(SO_2CF_3)$, and $N(SO_2F)_2$.

* * * * *